United States Patent

Mine et al.

[11] Patent Number: 5,978,336
[45] Date of Patent: Nov. 2, 1999

[54] OPTICAL DISK FINALIZATION METHOD AND OPTICAL DISK FINALIZATION APPARATUS

[75] Inventors: Norichika Mine, Kanagawa; Toru Takeda, Saitama; Shoei Kobayashi; Tetsu Kimura, both of Kanagawa, all of Japan

[73] Assignee: Sony Corporation, Tokyo, Japan

[21] Appl. No.: 08/942,257

[22] Filed: Oct. 1, 1997

[30] Foreign Application Priority Data

Oct. 4, 1996 [JP] Japan .............................. P08-264910

[51] Int. Cl.$^6$ ...................................................... G11B 7/00
[52] U.S. Cl. ................................................ 369/58; 369/47
[58] Field of Search ................................. 369/48, 47, 49, 369/50, 54, 58, 59, 60, 32, 13, 44.13; 360/48, 51

[56] References Cited

U.S. PATENT DOCUMENTS

| | | | |
|---|---|---|---|
| 5,270,877 | 12/1993 | Fukushima et al. ................... | 369/56 X |
| 5,602,690 | 2/1997 | Tomisaki et al. ....................... | 360/75 |
| 5,617,388 | 4/1997 | Ishioka et al. ....................... | 369/44.28 |
| 5,761,169 | 6/1998 | Mine et al. ............................ | 369/84 |
| 5,805,564 | 9/1998 | Kobayashi et al. ................... | 369/275.3 |
| 5,815,486 | 9/1998 | Kobayashi et al. ................... | 369/275.4 |
| 5,828,639 | 10/1998 | Kobayashi et al. ................... | 369/58 |
| 5,835,461 | 11/1998 | Kobayashi et al. ................... | 369/48 |
| 5,835,468 | 11/1998 | Kobayashi et al. ................... | 369/59 |
| 5,835,478 | 11/1998 | Kobayashi et al. ................... | 369/275.3 |
| 5,862,123 | 1/1999 | Horie et al. ....................... | 369/44.13 X |
| 5,878,024 | 3/1999 | Kobayashi et al. ................... | 369/275.3 |
| 5,886,985 | 3/1999 | Kobayashi et al. ................... | 369/275.3 |
| 5,901,124 | 5/1999 | Kobayashi et al. ................... | 369/47 |

*Primary Examiner*—Muhammad Edun
*Attorney, Agent, or Firm*—Limbach & Limbach LLP; Seong-Kun Oh

[57] ABSTRACT

The present invention provides a finalization method and apparatus which enables out a reproduction of an optical disk such as a DVD-RAM by using a reproduction apparatus which carries out CLV reproduction. The finalization method according to the present invention includes creating an unrecorded area map of an optical disk on the Logical block address (LBA). In order to execute in the host application a conversion from LBA to Physical Block Address (PBA) which is normally executed in an optical disk drive, a conversion table from LBA to PBA is created. According to this conversion table, the unrecorded area map is converted from LBA into PBA so as to assure the area to be finalized. A dummy data is recorded in the aforementioned assured area of the optical disk.

34 Claims, 8 Drawing Sheets

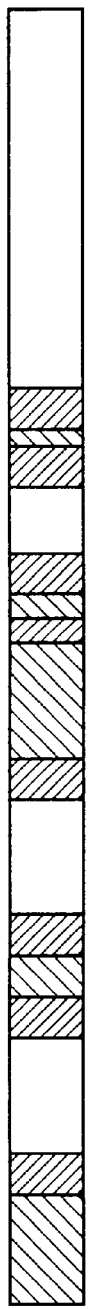
FIG.11A
FIG.11B
300~350 TRACKS
RANGE X
 TO BE RECORDED IN FINALIZATION
 RECORDED SPACE
 UNRECORDED SPACE

OPTICAL DISK FINALIZATION METHOD AND OPTICAL DISK FINALIZATION APPARATUS

BACKGROUND OF THE INVENTION

1. Field of the Invention

The present invention relates to an optical disk recording method and more particularly, to an optical disk finalization method and an optical disk finalization apparatus.

2. Description of the Prior Art

In an optical disk capable of recording and reproduction, a wobbled groove guide is formed so as to enable tracking control even in a state of no data recorded. As shown in FIG. 1, this wobbled groove guide draws a sinusoidal wave pattern on a track of a substrate of the optical disk. An optical disk drive obtains a servo information from an edge of this wobbled groove guide for reproducing a data recorded on the optical disk. Moreover, the wobbled groove guide which is the sinusoidal wave pattern has been subjected to a frequency modulation corresponding to an address information. According to an address (address in pregroove which will be referred to as ADIP hereinafter) assigned for this wobbled groove guide, the optical disk drive detects a position information on the optical disk for reading a signal from the optical disk and for writing a signal onto the optical disk.

Consequently, the aforementioned optical disk capable of both recording and reproduction can record and reproduce a signal by using a recording reproduction apparatus provided with a circuit for reading the ADIP (hereinafter, referred to as ADIP-reader) even if a data is recorded not sequentially but intermittently.

There is also an optical disk reproduction apparatus which is dedicated to reproducing a sequentially recorded data and which is not provided with the aforementioned ADIP-reader. Such a reproduction apparatus controls the rotation of an optical disk by reproducing a recorded data and carrying out a so-called CLV (constant linear velocity) control to a spindle motor so that a clock extracted from the reproduced data has a constant cycle.

Consequently, in order to reproduce the aforementioned optical disk capable of both recording and reproduction by the reproduction apparatus which carries out this CLV reproduction, what is required is that the optical disk have a data formatted in a common format and the data be recorded sequentially.

However, even when reproducing the aforementioned optical disk capable of both recording and reproduction by using a reproduction apparatus which carries out CLV reproduction, this optical disk cannot be reproduced if the data is recorded not sequentially but intermittently. That is, a data reproduction by way of CLV reproduction brings about only a partial data reproduction and accordingly, it is impossible to reproduce a clock. Consequently, the reproduction apparatus which carries out a CLV reproduction cannot control rotation of the optical disk and the spindle motor runs away in the worst case.

SUMMARY OF THE INVENTION

It is therefore an object of the present invention to provide an optical disk finalization method and an optical disk finalization apparatus which enables that an optical disk capable of recording and reproduction and having an intermittently recorded data is reproduced by a reproduction apparatus which carries out a CLV reproduction.

In order to achieve the aforementioned object, there is provided an optical disk finalization method according to the present invention comprising: a step of creating a data recorded/unrecorded map for an optical disk on a logical block address, according to a file management information stored in the optical disk; a step of converting the recorded/unrecorded map created on the logical block address, into a recorded/unrecorded map of a physical block address; a step of defining a data unrecorded area of the optical disk according to the recorded/unrecorded map of the physical block address; and a step of finalization by recording a dummy data in the unrecorded area defined.

According to a file management information of an optical disk having an intermittently recorded data, data-recorded areas and data-unrecorded areas are identified on the logical block address. The file management information is formatted in a UDF file system. A recorded/unrecorded map is created on the logical block basis so as to distinguish the data-recorded areas from the data-unrecorded areas. Next, a conversion table is created for converting the logical block address into a physical block address which is the address on the optical disk. By using this conversion table, a recorded/unrecorded map on the physical block basis is created from the recorded/unrecorded map on the logical block basis. From this recorded/unrecorded map on the physical block basis, unrecorded areas on the optical disk are identified. A dummy data having a correct field address is recorded in the unrecorded areas so that the optical disk capable of recording and reproduction can be reproduced by a reproduction apparatus which carries out CLV reproduction.

The optical disk finalization apparatus according to the present invention comprises: an optical disk drive for recording/reproducing a data onto/from an optical disk which stores a file management information; and a host computer which creates a data recorded/unrecorded map of the optical disk on a logical block address converts the recorded/unrecorded map created on the logical block address, into a recorded/unrecorded map of a physical block address; and defines a data-unrecorded area of the optical disk according to the recorded/unrecorded map of the physical block address; wherein the optical disk drive executes finalization by recording a dummy data in an unrecorded area of the optical disk defined by the host computer.

The host computer reads out from an optical disk drive a file management information of an optical disk having an intermittently recorded data, and identifies the data-recorded area and the data-unrecorded area on the logical block address. The file management information of the optical disk is formatted in the UDF system. The host computer creates a recorded/unrecorded map on the logical block basis so that the data-recorded area can be distinguished from the data-unrecorded area. Next, the host computer reads out from the optical disk drive the conversion table for conversion from the logical block address into the physical block address which is the address on the optical disk. According to this conversion table, the host computer creates a recorded/unrecorded map on the physical block basis from the recorded/unrecorded map of the logical block basis. From this recorded/unrecorded map of the physical block basis, the host computer identifies a data-unrecorded area on the optical disk. The drive apparatus records a dummy data in this unrecorded area identified by the host computer so that the optical disk capable of recording and reproduction can be reproduced by a reproduction apparatus which carries out CLV reproduction.

BRIEF DESCRIPTION OF THE DRAWINGS

FIGS. 11A–11B explain an area; where a dummy data is to be recorded.

DETAILED DESCRIPTION OF PREFERRED EMBODIMENTS

Hereinafter, embodiments of the present invention will be explained with reference to the attached drawings. An optical disk finalization apparatus according to an embodiment of the present invention carries out a finalization of an optical disk capable of recording and reproduction such as a digital video disk.

Firstly, the term "finalization" will be explained. Generally, a low-price optical disk drive dedicated for reproduction carries out a data by CLV reproduction. Consequently, when reading out a data from an optical disk capable of recording and reproduction by using an optical disk drive dedicated for reproduction, the data cannot be readout even if the data is identically formatted unless the data is recorded sequentially. In order to read out from an optical disk capable of recording and reproduction using a reproduction apparatus which carries out CLV reproduction, it is necessary that a data be recorded in an identical format and the data be recorded sequentially. In a case when a data has been recorded intermittently, it is necessary that a dummy data having a correct field address be recorded at a predetermined area preceding and following the recorded data. When the dummy data is recorded, it is possible to access a data containing a servo information for CLV reproduction using the field address of the dummy data.

That is, "finalization" means to record a data having a correct field address at a predetermined range preceding and following a recorded area of an optical disk having an intermittently recorded data, so that a data can be read out by CLV reproduction.

Figure 1:
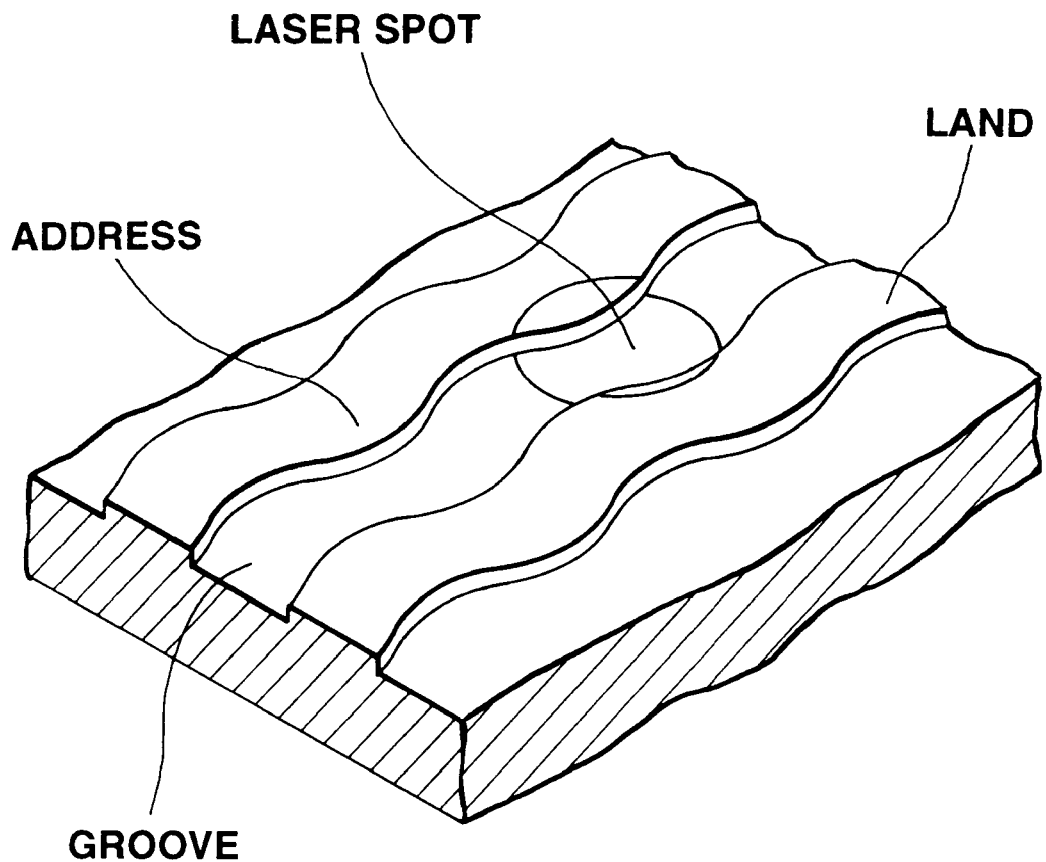
FIG. 1 is a perspective view showing a wobbled groove guide formed on an optical disk.
Figure 2:
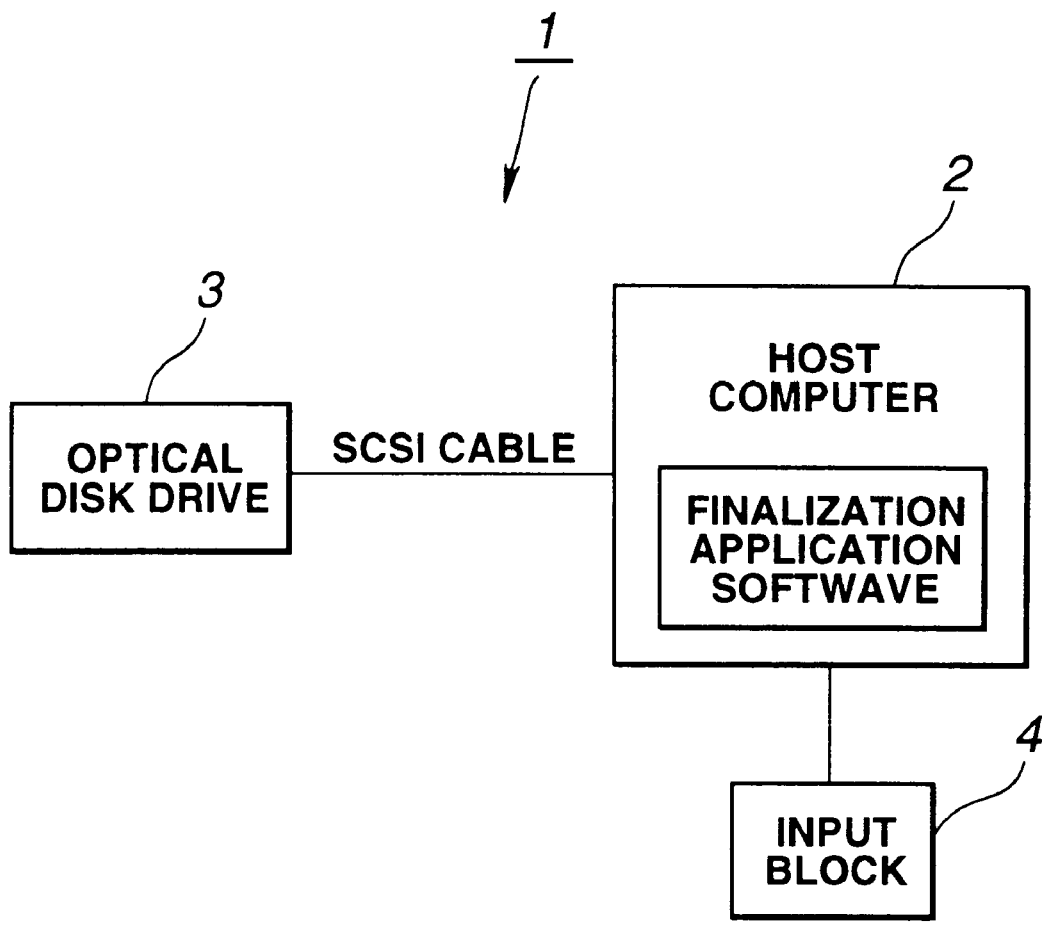
FIG. 2 is a block diagram showing a configuration of a finalization apparatus according to the present invention.

FIG. 2 is block diagram showing a finalization apparatus 1 according to the present invention, including: a host computer 2; an optical disk drive 3 for carrying out a recording/reproduction onto/from an optical disk; and an input block 4. The finalization apparatus 1 starts an operation, for example, when an input is specified by a user. According to a command from the input block 4, the host computer 2 starts a finalization application software provided in the host computer 2. The optical disk drive 3 is connected to the host computer 2 by SCSI (small computer systems interface) and, according to the aforementioned finalization application software, reads a data to be processed by the host computer, out of a recording medium, i.e., an optical disk capable of recording and reproduction, or writes a data onto the optical disk.

Description will now be directed to an algorithm of the finalization application software provided in the host computer 2. Note that the file system of UDF (Universal Disk Format, which is a trade mark of the Optical Storage Technology Association) is used for the optical disk. The UDF file system has specifications based on the ISO/IEC13346 standard. Defect Management of the optical disk such as an alternate sector is executed in the optical disk drive.

Figure 3:
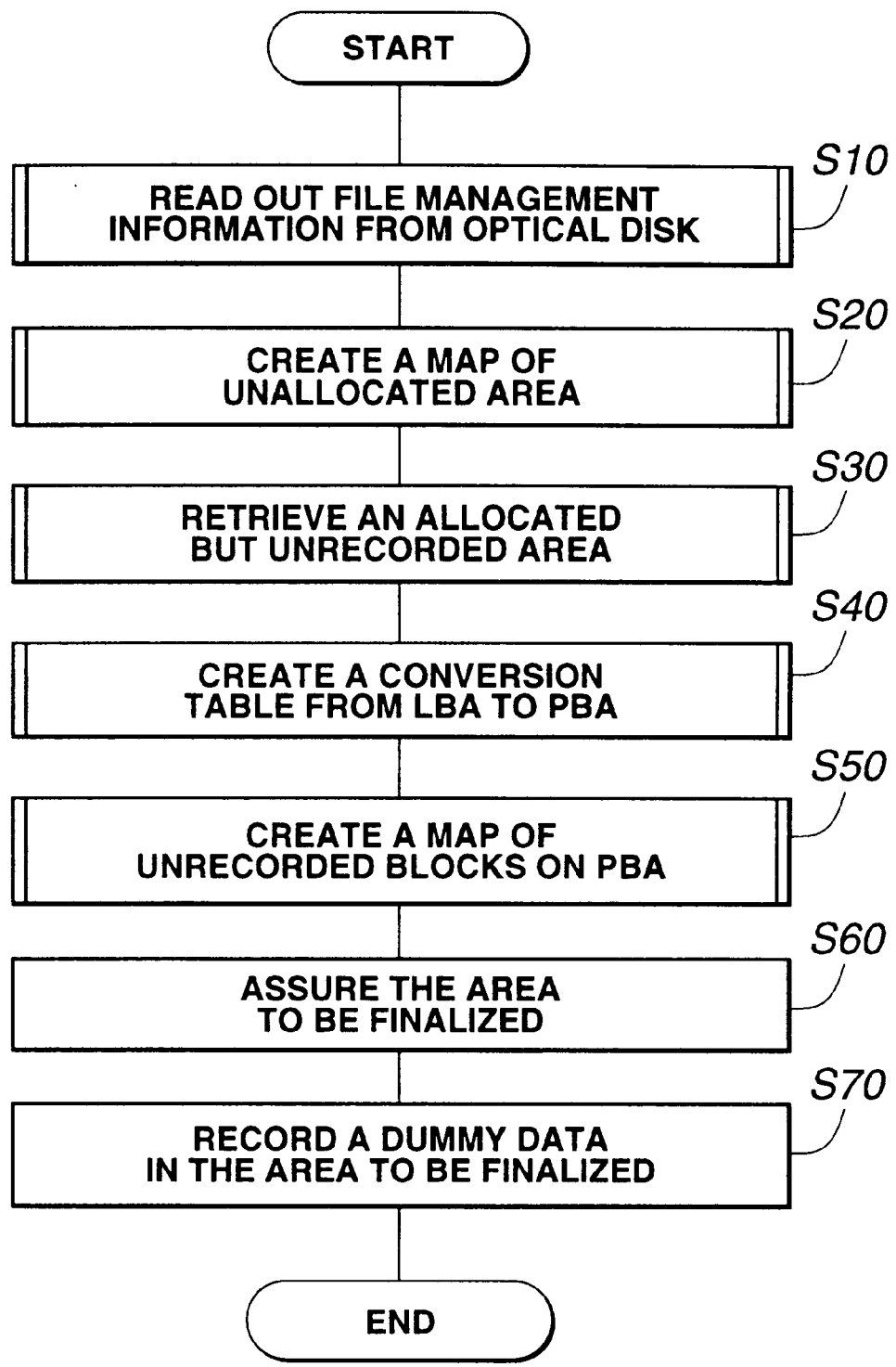
FIG. 3 is a flowchart showing an algorithm of a finalization application software.

FIG. 3 is a flowchart showing the algorithm of the finalization application software. This algorithm carries out a finalization by the steps S10 through S70.

When the finalization application software is started, a processing of step S10 is started.

In step S10, a file management information is read out from the optical disk. In a normal file system, the file management information handles a directory information, a file tree structure, and a map showing an area where a new data can be recorded. In the UDF file system used in the present embodiment, a Logical Volume Descriptor indicates a final route directory, from which all the directories and files can be retrieved. Moreover, in the UDF file system, a Partition Header Descriptor of a Partition Descriptor specifies an Unallocated Space Bit Map, which indicates a map showing an area where a new data can be recorded. This Unallocated Space Bit Map is a table showing allocated/not allocated information in the entire region under the file management, on a 1-bit basis. That is, in step S10, the aforementioned file management information is read out.

Figure 4:
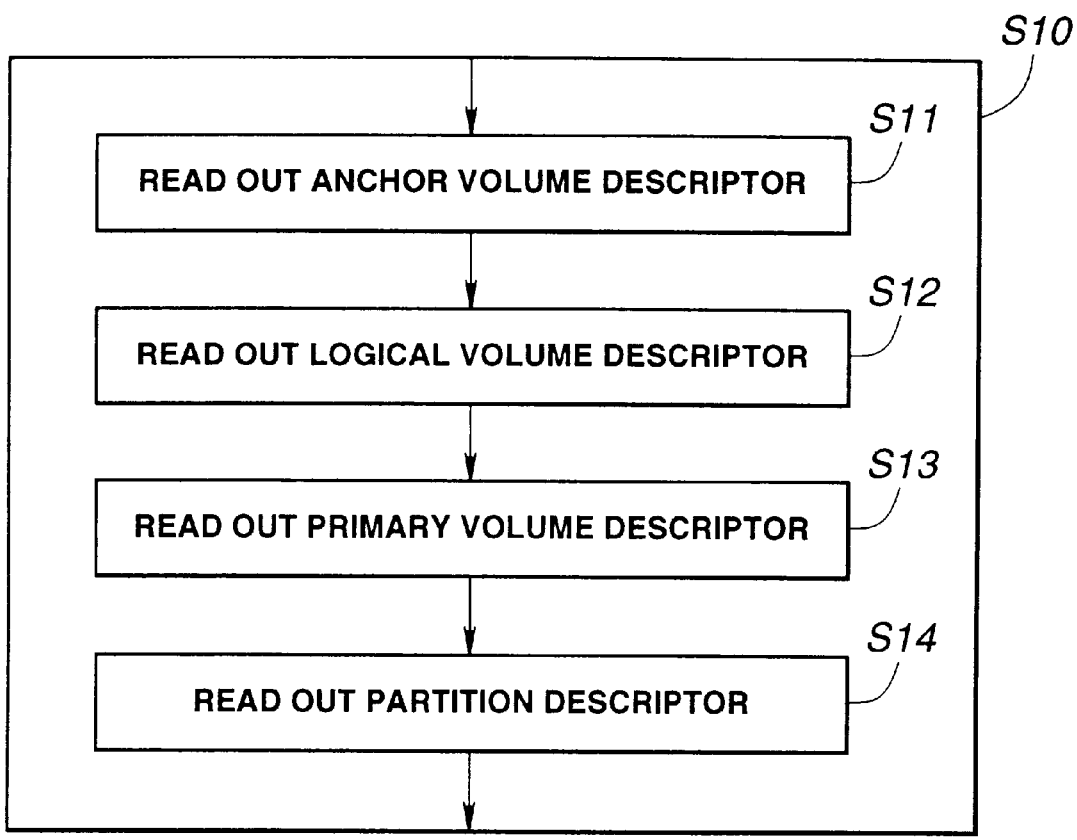
FIG. 4 is a flowchart showing a step of the finalization application software algorithm for reading out a file management data from the optical disk.

More precisely, step S10 is carried out by step S11 to step S14 shown in a flowchart of FIG. 4.

Step 11 reads out an Anchor Volume Descriptor of the optical disk file management information. The following step S12 reads out a Logical Volume Descriptor, from which a route directory is specified, and reads out a Primary Volume Descriptor at step 513. The following step S14 reads out a Partition Descriptor from the Primary Volume Descriptor.

Figure 5:
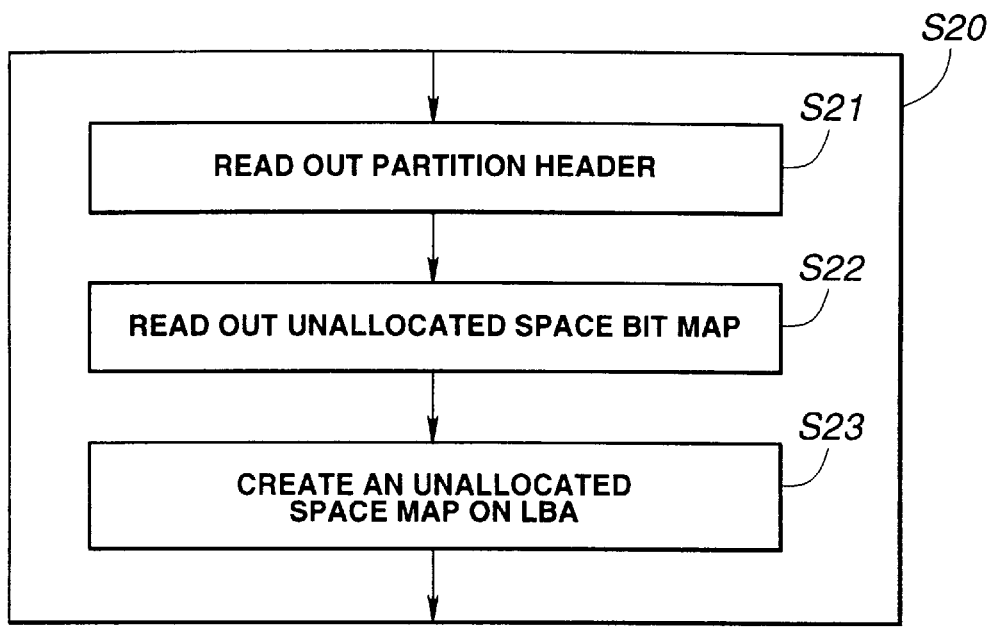
FIG. 5 is a flowchart showing a step included in the finalization application software algorithm for creating a map of unallocated areas.

In step 20, according to the file management information read out in step S10, a map indicating unallocated areas is created on a logical block address (LBA). This step 20 is carried out by step S21 to S23 in a flowchart of FIG. 5.

Figure 6:
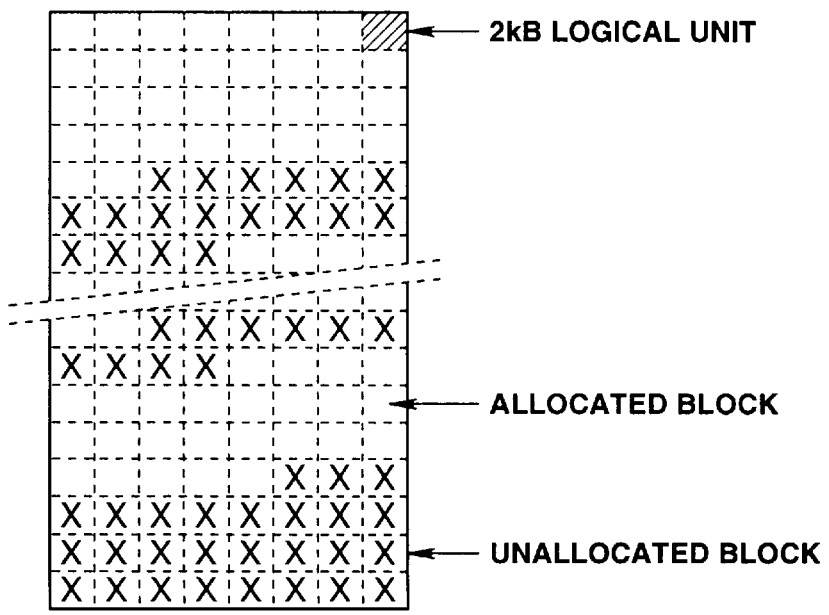
FIG. 6 explains a map of an unallocated areas on the logical block address (LBA).

In step S21, according to the Partition Descriptor which has been read out in step S14, a Partition Header Descriptor is read out. The following step S22 reads out the aforementioned Unallocated Space Bit Map. The following step S23 creates a map indicating unallocated areas on a logical block address (LBA) according to the Unallocated Space Bit Map which shows the allocated/not allocated information over the entire file management region on a 1-bit basis. As shown in FIG. 6, this map is expressed by a logical block of 2-kilo byte basis. In this FIG. 6, the areas indicated by "X" are the unallocated areas.

Figure 7:
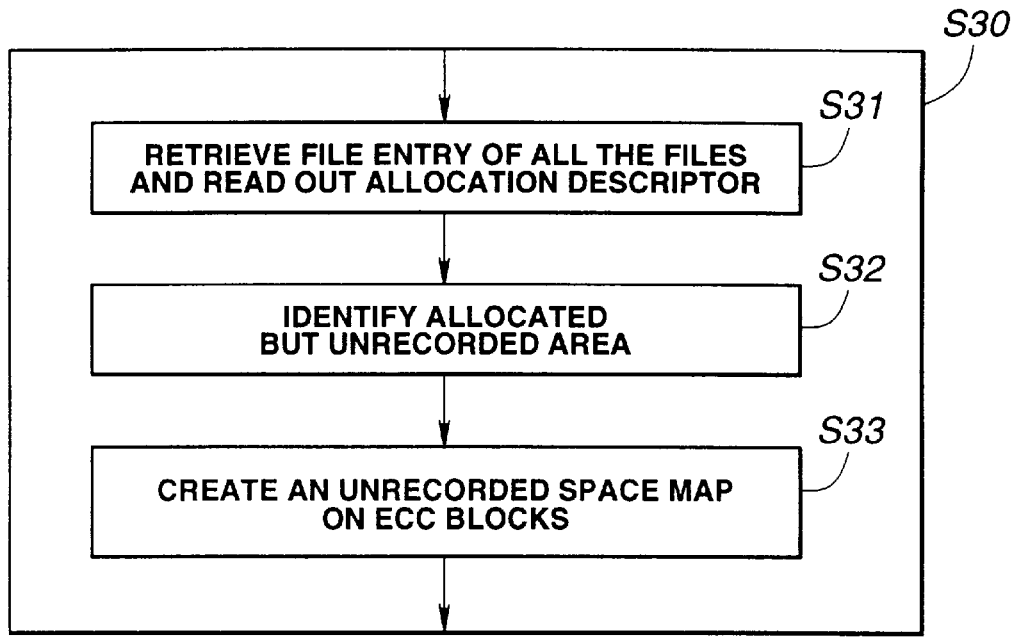
FIG. 7 is a flowchart showing a step included in the finalization application software algorithm for checking an area which has been allocated on the file management information but contains no data recorded.

Subsequently, in step 30, a check is made to find areas which are allocated on the file management information but contain no data. Such an "allocated but not recorded blocks"

is, for example, a block to be used for recording a data in the future and has been allocated in the file management but presently contains no data recorded. Without checking these unrecorded areas, it is impossible to execute finalization. This step 30 is executed according to the flow from step S31 to step S33 shown in FIG. 7.

Step S31 retrieves File Entry of all the files and reads out Allocation Descriptors. The File Entry indicates an area assigned for the file and attributes of the file. For each of the files, a corresponding route directory can be found from the aforementioned Logical Volume Descriptor. In step S32, the blocks not recorded but allocated are checked according to the File Entry.

Figure 8:
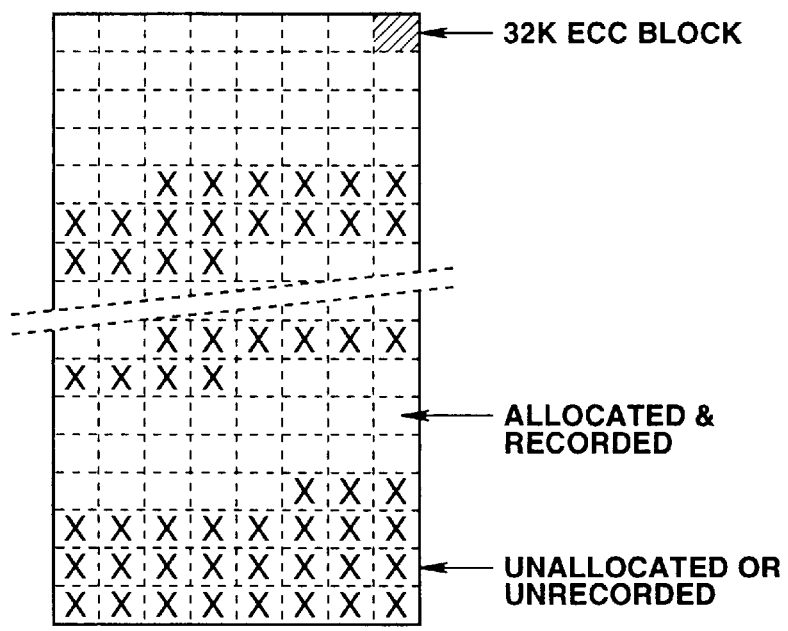
FIG. 8 explains a map of unallocated areas on the logical block address (LBA) on 32-kilo byte basis which is an error correction unit (ECC unit).

In step S33, a map of unrecorded blocks is created. This map of unrecorded blocks includes the blocks not recorded but allocated and the areas not allocated allocated. As shown in FIG. 8, this map is created on a logical block address (LBA) on a 32 k-byte basis which is an error correction unit (ECC unit). This ECC unit of 32 k bytes corresponds to an actual write unit onto an optical disk and equals to 16 sectors of the aforementioned 2 k-byte logical block address (LBA).

Figure 9:
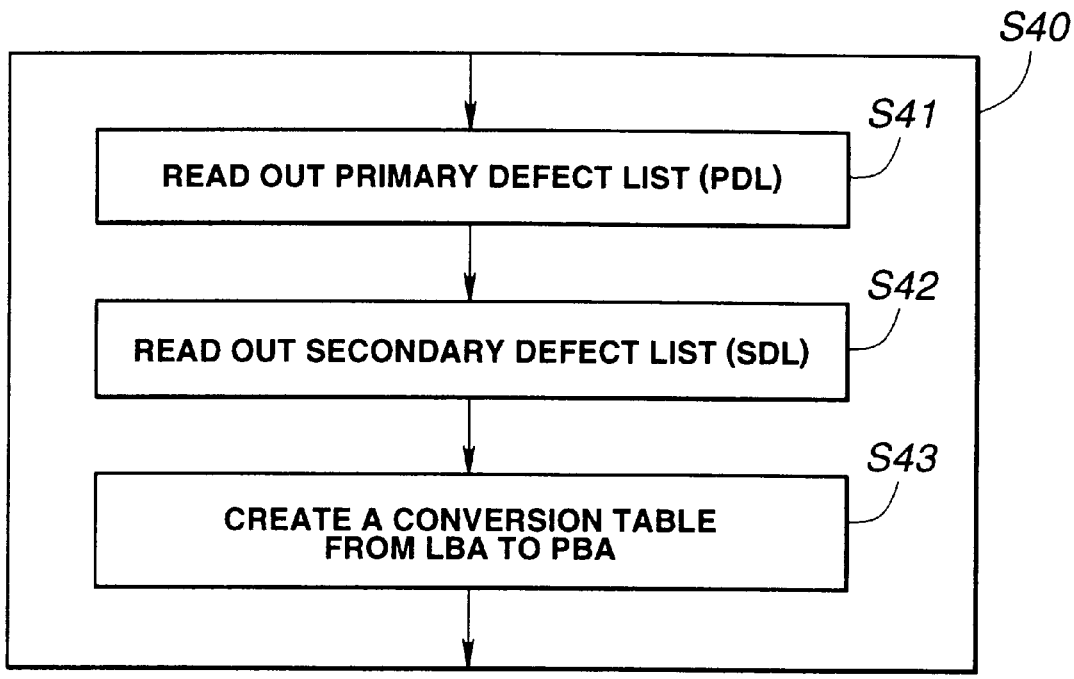
FIG. 9 is a flowchart showing a step included in the finalization application software algorithm for creating a conversion table for converting a logical block address (LBA) into a physical block address (PBA).

Referring to FIG. 3, in step S40, a table is created for converting LBA into a physical block address (PBA). The aforementioned processing of step S10 to step S30 is executed in LBA, but in order to execute finalization, it is necessary to find unrecorded areas on the recording medium, i.e., on the optical disk, according to PBA. However, conversion from LBA to PBA is normally executed not in the application of the host computer but in the optical disk drive. For this, it is necessary to retrieve an optical disk Defect Management information such as a replacement sector from the optical disk drive into the host computer so as to create the conversion table on the application. Note that the Defect Management information cannot be read out by using a normal read-out command. For example, if the interface is SCSI, it is necessary to define a new command to read out the Defect Management information or to provide a physical address mode for the read-out command. More precisely, step S40 is executed by a flow of step S41 to step S43 as shown in FIG. 9.

Step S41 reads out a Primary Defect List (PDL), and step S42 reads out a Secondary Defect List (SDL). Step S43 creates a conversion table from LBA to PBA by using the PDL and the SDL. That is, according to the defect sector, a table is created to find LBA corresponding to a signal length capable of continuous recording on the PBA.

Figure 10:
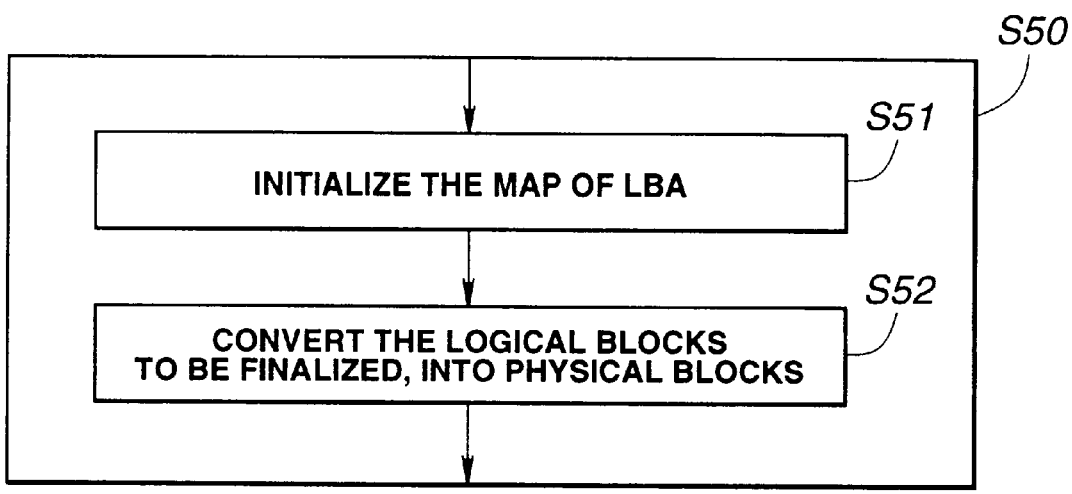
FIG. 10 is a flowchart of a step included in the finalization application software algorithm for creating a map of unrecorded blocks on the physical block address.

In step S50, an unrecorded block map is created on the PBA from the aforementioned conversion table and the LBA map. More precisely, this step S50 is executed by a flow of steps S51 to step S52 as shown in FIG. 10.

In step S51, the PBA unrecorded block map is initialized. In this initialization, it is necessary to initialize all the blocks containing a spare area. Next, in step S52, by using the LBA-to-PBA conversion table, an unrecorded block map of the physical blocks is created from the unrecorded block map of the logical blocks.

In step S60, according to the unrecorded block map of the physical blocks, an area is assigned for recording a dummy data for finalization. As shown in FIG. 11A, the area for recording the dummy data is by defined by a predetermined number of tracks preceding and following a data recorded area. The predetermined number is about 300 to 500 tracks, which is sufficient for reproducing a clock when carrying out a CLV reproduction. The reason why each of the data recorded area is sandwiched between the dummy data is that, for example, when a Seek command is executed to find the head of the reproduction apparatus, it may happen that the head point reaches an area following a data.

The area for recording a dummy data for finalization is not limited to the aforementioned predetermined number of tracks but it is also possible to record all the unrecorded areas. Furthermore, for example, it is possible to detect recorded/unrecorded areas on the optical disk as a hardware by detecting an RF signal and to determine a size of the unrecorded area "Range X" on the optical disk as shown in FIG. 11B so that a finalization can be executed by a single command without assuring the "not recorded but allocated" area in the aforementioned step S32, on the condition that the aforementioned recorded/unrecorded area information has a sufficient reliability.

In step S70, the dummy data is actually recorded in the areas to be recorded with the dummy data which areas have been determined in step S60. For this, the host computer 2 supplies the optical disk drive 3 via the SCSI with a finalization command, physical block addresses to be recorded with the dummy data, and a list of dummy data signs. The optical disk drive 3 records the dummy data having a correct field address in the recording area transferred from the host computer 2, while sensing a recording state.

When the optical disk drive 3 has recorded the dummy data in all the predetermined area, the finalization is complete.

Thus, the finalization apparatus 1 according to the present invention enables to read out of a data by CLV reproduction by recording a dummy data by the finalization process of an optical disk capable of recording and reproduction.

It can also be considered as a finalization to record a dummy data while sensing an RF signal to determine a data recording state of the optical disk. Moreover, in this case, a failure of the RF sensing may cause data overwriting. Additionally, it is necessary to carry out finalization over the entire region of the optical disk. On the other hand, the finalization apparatus 1 according to the present invention will not cause any data overwriting, nor require finalization over the entire region of the optical disk.

In the finalization method according to the present invention, a data recorded/unrecorded map of an optical disk is created on the logical block address (LBA), which map is then converted into a recorded/unrecorded map on the physical block address (PBA). According to this recorded/unrecorded map on the PBA, a data unrecorded area of the optical disk is defined, into which a dummy data is recorded for finalization. This enables data reproduction by CLV reproduction from an optical disk capable of recording and reproduction and having an intermittently recorded data. The present invention also prevents data overwriting during a finalization.

Moreover, the optical disk finalization method according to the present invention permits finalizing an optical disk with a high efficiency by recording a dummy data in an unrecorded area of a predetermined range preceding and following a data-recorded area.

Furthermore, in the optical disk finalization method according to the present invention, a dummy data is recorded in all the data-unrecorded areas for finalization. Consequently, finalization need not be repeated for the optical disk which has been finalized once and contains new recorded data.

In the optical disk finalization apparatus according to the present invention, the host computer defines unrecorded areas, and the drive unit records a dummy data in these unrecorded areas defined by the host computer, thus enabling reproduction of an optical disk having an intermittently recorded data by using a reproduction apparatus which carries out a CLV reproduction. Moreover, data overwriting during a finalization can be eliminated.

Moreover, in the optical disk finalization apparatus according to the present invention, finalization is carried out by recording a dummy data in an unrecorded area of a predetermined range preceding and following a data recorded area. This enables the system to carry out the finalization with a high efficiency.

Furthermore, in the optical disk finalization apparatus according to the present invention, a finalization is carried out by recording a dummy data in all the data unrecorded areas over the entire optical disk recording region. Consequently, after a finalization is carried out and a new data is recorded on the optical disk, there is no necessity to repeat the finalization.

What is claimed is:

1. An optical disk finalization method, comprising the steps of:
   creating a data recorded/unrecorded map for an optical disk on a logical block address according to a file management information stored in the optical disk;
   converting said recorded/unrecorded map created on the logical block address into a recorded/unrecorded map of a physical block address;
   defining a data unrecorded area of the optical disk according to said recorded/unrecorded map of the physical block address; and
   performing finalization on said optical disk.

2. The method of claim 1 wherein said finalization step includes the step of recording a dummy data in a predetermined range of an unrecorded area preceding and following a data-recorded area.

3. The method of claim 2 wherein said optical disk is a digital video disk.

4. The method of claim 3 wherein said file management information is formatted according to a UDF file system.

5. The method of claim 2 wherein said file management information is formatted according to a UDF file system.

6. The method of claim 1 wherein the finalization step includes recording a dummy data in all the unrecorded areas over the entire region of the optical disk.

7. The method of claim 6 wherein said optical disk is a digital video disk.

8. The method of claim 7 wherein said file management information is formatted according to a UDF file system.

9. The method of claim 6 wherein said file management information is formatted according to a UDF file system.

10. The method of claim 1 wherein said optical disk is a digital video disk.

11. The method of claim 1 wherein said file management information is formatted according to a UDF file system.

12. An optical disk finalization apparatus, comprising:
   an optical disk drive for recording/reproducing a data onto/from an optical disk which stores a file management information; and
   a host computer for creating a data recorded/unrecorded map of said optical disk on a logical block address, converting said recorded/unrecorded map created on the logical block address into a recorded/unrecorded map of a physical block address, and defining a data-unrecorded area of the optical disk according to said recorded/unrecorded map of the physical block address;
   wherein said optical disk drive is configured to perform finalization process on said optical disk.

13. The apparatus of claim 12 wherein the unrecorded area of the optical disk defined by said host computer is an unrecorded area of a predetermined range preceding and following a data-recorded area, and said optical disk drive performs the finalization process by recording a dummy data in the unrecorded area of the predetermined range preceding and following said data-recorded area.

14. The apparatus of claim 13 wherein said optical disk is a digital video disk.

15. The apparatus of claim 14 wherein said file management information is formatted according to a UDF file system.

16. The apparatus of claim 13 wherein said file management information is formatted according to a UDF file system.

17. The apparatus of claim 12 wherein the data-unrecorded area defined by said host computer includes all the unrecorded areas over the entire region of the optical disk, and said optical disk drive performs the finalization process by recording the dummy data in all the unrecorded areas over the entire region of said optical disk.

18. The apparatus of claim 17 wherein said optical disk is a digital video disk.

19. The apparatus of claim 18 wherein said file management information is formatted according to a UDF file system.

20. The apparatus of claim 17 wherein said file management information is formatted according to a UDF file system.

21. The apparatus of claim 12 wherein said optical disk is a digital video disk.

22. The apparatus of claim 12 wherein said file management information is formatted according to a UDF file system.

23. A recording/reproducing medium finalization method, comprising the steps of:
   reproducing a file management information from a recording/reproducing medium;
   creating a map on a logical block address indicating an unallocated area in accordance with the file management information;
   determining an area allocated on the file management information which does not contain data;
   creating a conversion table for converting the logical block address to a physical block address;
   creating an unrecorded block map on the physical block address in accordance with the conversion table and the map on the logical block address;
   assigning an area for recording a dummy data in accordance with the unrecorded block map; and
   recording the dummy data in the area assigned for recording the dummy data.

24. The method of claim 23 wherein said step of reproducing the file management information includes the steps of:
   reproducing an anchor volume descriptor of the file management information;
   reproducing a logical volume descriptor of the file management information;
   reproducing a primary volume descriptor of the file management information and in accordance therewith, specifying a route directory; and
   reproducing a partition descriptor from the primary volume descriptor;

wherein said logical volume descriptor indicates said route directory from which a plurality of directories and files can be retrieved.

25. The method of claim 24 wherein said step of creating the map on the logical block address includes the steps of:
   reproducing a partition header descriptor in accordance with the partition descriptor; and
   reproducing an unallocated space bit map indicating an area of said recording/reproducing medium where new data can be recorded, and in accordance therewith creating said map on the logical block address.

26. The method of claim 25 wherein the partition header descriptor includes a table showing allocated and unallocated information in the file management region of the recording medium on a 1-bit basis.

27. The method of claim 25 wherein the map on the logical block address indicating the unallocated area is provided in a logical block in a 2 kilo-byte basis.

28. The method of claim 25 wherein said step of determining said area allocated on the file management information which does not contain data includes the steps of:
   retrieving a file entry of all recorded files on the recording/reproducing medium, the file entry indicating an area assigned for each file and the corresponding attributes;
   reproducing a plurality allocation descriptors;
   verifying a plurality of blocks allocated but unrecorded in accordance with the file entry;
   creating a map of unrecorded blocks, the map of unrecorded blocks including said blocks not recorded but allocated and areas not allocated.

29. The method of claim 28 wherein the map of said unrecorded blocks is created on a logical block address on a 32 kilo-byte basis.

30. The method of claim 28 wherein said step of creating said conversion table for converting the logical block address to the physical block address includes the step of reproducing a primary defect list and a secondary defect list, wherein said conversion table correlates the logical block address to a corresponding signal length capable of continuous recording on the physical block address in accordance with said primary and secondary defect lists.

31. The method of claim 30 wherein said step of creating an unrecorded block map on the physical block address includes the step of initializing the unrecorded block map of the physical block address such that all blocks containing a spare area are initialized, wherein the unrecorded block map of the physical block address is created from the unrecorded block map of the logical block address in accordance with the conversion table.

32. The method of claim 23 wherein the area for recording the dummy data is approximately 300 to 500 tracks preceding and following a data recorded area, respectively.

33. The method of claim 23 wherein the area for recording the dummy data includes all unrecorded area over the entire data region of the recording/reproducing medium.

34. The method of claim 23 wherein the step of recording the dummy data includes the steps of:
   receiving a finalization command;
   receiving the physical block address for recording with the dummy data and a list of dummy data signals; and
   recording the dummy data having a correct field address in the recording area while detecting a corresponding recording state.

* * * * *